United States Patent [19]
Bashor

[11] 3,759,124
[45] Sept. 18, 1973

[54] AUTOMATIC CUT-OFF SAW
[76] Inventor: Berl E. Bashor, 802 15th Ave., Conway, S.C. 29526
[22] Filed: Dec. 28, 1970
[21] Appl. No.: 101,853

[52] U.S. Cl................. 83/81, 83/109, 83/119, 83/157, 83/210, 83/231, 83/416, 83/471.2, 83/490
[51] Int. Cl............................. B27b 5/06, B26d 7/06
[58] Field of Search.............. 143/46 F, 46 R, 47 R; 83/71, 925, 81, 109, 119, 157, 209, 210, 211, 212, 222, 231, 247, 416, 471.2, 483, 490

[56] References Cited
UNITED STATES PATENTS
3,019,823   2/1962   Cornell........................ 143/46 F
2,889,858   6/1959   Roberts........................ 143/46 F
3,550,653   12/1970  Gauthier....................... 143/46 F Primary Examiner—Donald R. Schran
Attorney—B. P. Fishburne, Jr.

[57] ABSTRACT

When a cut-off saw moves to a non-cutting position, a first linkage is operated to shift a lumber feeding roller into active engagement with the lumber and to simultaneously de-activate a lumber holding brake. The lumber is fed longitudinally until its leading end engages a limit switch. This switch activates means to move the saw toward a cut-off position and this movement of the saw de-activates the feed roller and resets the lumber holding brake during the cut. As the saw completes the cut, a second linkage is operated to cause quick dumping of the lumber from the machine. As the lumber disengages the limit switch, the machine automatically recycles to the starting condition.

3 Claims, 5 Drawing Figures

INVENTOR
BERL E. BASHOR
ATTORNEY

INVENTOR
BERL E. BASHOR

BY *B.P. Fishburn, Jr.*

ATTORNEY

AUTOMATIC CUT-OFF SAW

The objective of the invention is to provide a simple, practical and reliable automatic cut-off saw which has a full range of adjustments and which is economical to manufacture and also rugged and durable and fast in operation. Cut-off saws are known in the prior art but, in general, these are manual or semiautomatic devices which do not have the ability to cut lumber or the like automatically to an exact, predetermined length. Where automation has been attempted in the prior art, the machines are unduly complex and costly and therefore have not been widely accepted. There is a great need for a cut-off saw or machine which is completely automatic and self-cycling and which can cut lumber to exact lengths completely automatically in a continuing cycle of operation and without excessive cost or complexity. It is believed that the present invention completely satisfies this need in the art, and other specific features and advantages of the invention will become apparent during the course of the following description.

BRIEF DESCRIPTION OF DRAWING FIGURES

DETAILED DESCRIPTION

Figure 4:
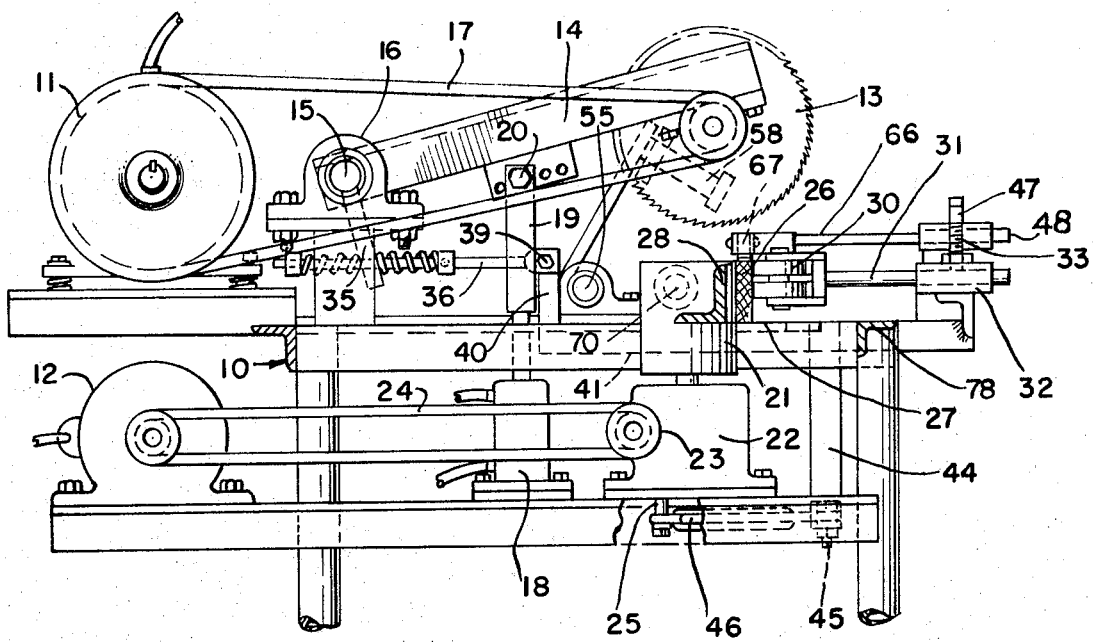
FIG. 4 is a similar section taken on line 4—4 of FIG. 2.

Referring to the drawings in detail, wherein like numerals designate like parts throughout the same, the machine embodies a sturdy support frame 10 whose constructional details are unimportant and upon which are mounted a saw driving motor 11 and a lumber feed roller drive motor 12 in superposed relation, as shown in FIG. 4. The cut-off saw blade 13 which in the present embodiment swings in a vertical arc is mounted on a spindle secured to the forward underside of a saw support arm 14 whose rear end is attached to a sturdy horizontal rocker shaft 15 journaled in bearings 16 fixed upon the machine frame 10. The saw blade 13 is driven at the proper speed from the motor 11 by a conventional belt drive 17, or by similar gearing. While the saw is illustrated as moving in a vertical arc with respect to the work, the machine can be constructed within the principles of the invention with the saw located above or below the work or moving in a rectilinear path.

The saw and its arm member 14 are raised and lowered with respect to the machine bed and work by the operation of a preferably pneumatic cylinder-piston unit 18 on the machine frame 10 having a vertical piston rod extension 19 pivotally connected at 20 to the arm member 14. The operation of this cylinder to raise and lower the cut-off saw is under control of a lumber-engaged limit switch and a conventional solenoid-operated valve or the like, as will be further described.

Spaced slightly upstream from the saw blade 13 is a vertical axis power-driven lumber feed roller 21 having a driving unit 22 of a conventional type fixedly mounted on the machine frame as shown in FIG. 4. The driving unit 22 has an input rotary pulley 23 engaged by a belt 24 driven from the motor 12, as shown. Thus, the rotary saw 13 and the lumber feed roller 21 have separate and independent drives. The feed roller 21 is shiftable horizontally forwardly and rearwardly with respect to the lumber and with respect to the driving unit 22 by a depending shifter pin 25 which projects below the unit 22 for connection with a linkage, to be described. The shifting arrangement of the roller 21 on the drive unit 22 is conventional and therefore the details of the roller driving unit 22 need not be described for a proper understanding of the invention.

The piece of lumber to be cut to length is indicated at 26 in the drawings and moves longitudinally over a machine bed member 27 and along an upstanding fixed guide rail 28 rigid with the machine frame 10. The guide rail 28 has a slot 29 formed therethrough adjacent the power-driven feed roller 21 so that the periphery of this roller may drivingly contact the inner side of the lumber 26 at the proper times. When this occurs, the opposite vertical side of the lumber 26 will be engaged and stabilized by a pair of ball bearing pressure rollers or wheels 30 carried by spaced parallel shafts 31 adjustably held in a fixed bracket 32 rigid with the machine frame. Set screws 33 allow the pressure rollers 30 and their shafts 31 to be adjusted, as required, toward and from the guide rail 28 so that lumber of any thickness can be accommodated.

Movable with the shiftable feed roller 21 under the influence of a common linkage to be described is a lumber brake or clamping shoe 34 having a friction face of rubber or the like. When the roller 21 is shifted inwardly or away from the lumber 26, the brake 34 actively engages the outer vertical side of the lumber 26 and clamps the same tightly against the fixed guide rail 28.

Figure 3:
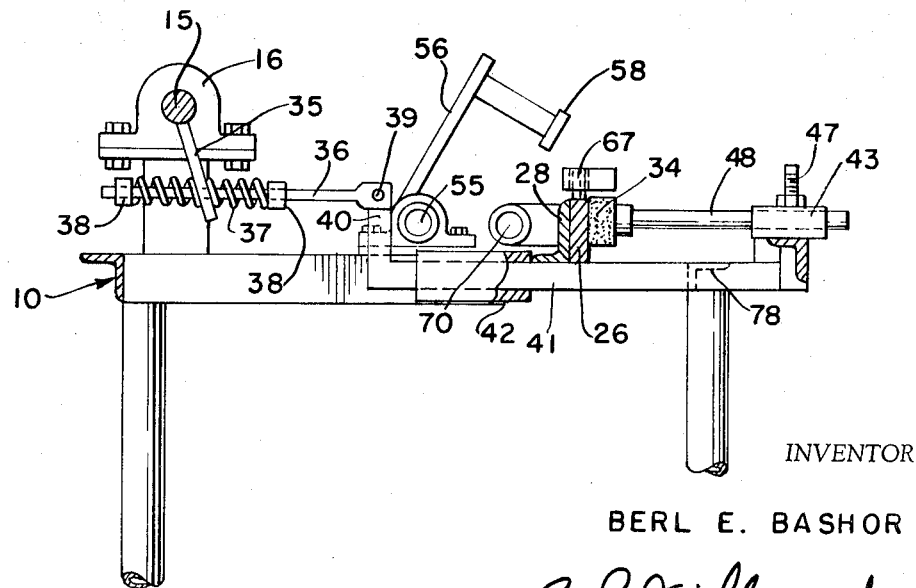
FIG. 3 is a transverse vertical section taken on line 3—3 of FIG. 2, with parts omitted.

The linkage for shifting the feed roller 21 and the brake 34 in unison, FIGS. 3 and 4, comprises a rigid crank arm 35 on the rocker shaft 15 projecting radially downwardly therefrom and turning with the rocker shaft to drive a horizontally guided link 36 through engagement with a cushioning spring 37 on this link held between two fixed collars 38 rigid with the link. The forward end of link 36 is connected at 39 with an upstanding extension 40 of another slide link 41 arranged at a lower elevation, FIG. 3, and operating through a fixed guide 42 on the machine frame. The slide link 41 is rigidly connected with the carrier 43 of the lumber brake 34 to shift the latter bodily with respect to the lumber. A depending linkage arm 44 rigid with the sliding link 41 is connected at its bottom as at 45 with a horizontal shifter link 46 connected with the shifting pin 25 of the feed roller 21, FIG. 4. Consequently, when the link 41 is shifted longitudinally by the action of the crank arm 35 and associated elements, the feed roller 21 is shifted in unison with the lumber clamping brake 34 in one direction or the other, depending upon the direction of turning of the rocker shaft 15. The brake 34 is adjustable on its carrier 43 through a set screw 47 bearing on a shaft 48 which carries the brake. Therefore, as viewed in FIG. 4, when the saw blade 13 and its arm 14 are lowered to make a cut, the rocker shaft 15 and crank arm 35 will turn clockwise and the slide link 41 will retract to the left to disengage the feed roller 21 from the work and to engage the clamping brake 34 therewith, and the reverse sequence occurs to feed the lumber 26 along the guide rail 28 when the saw is elevated.

Figure 5:
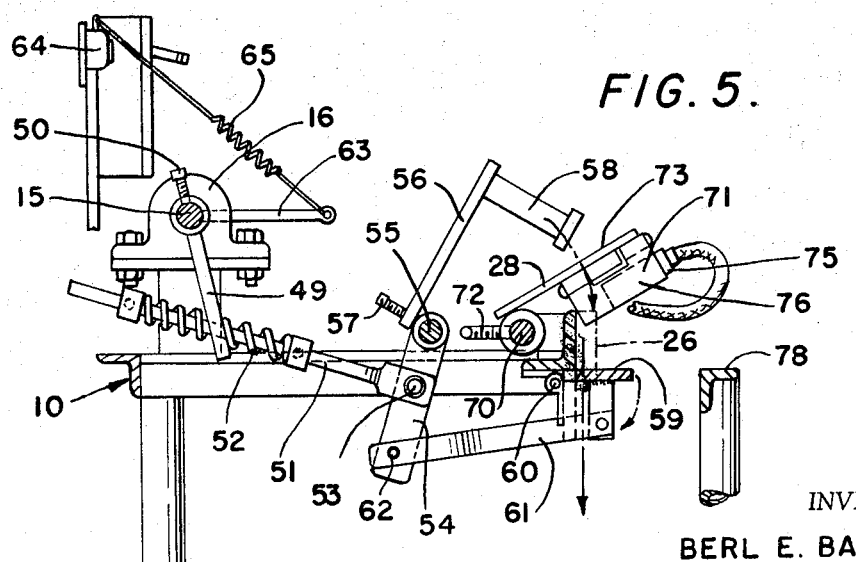
FIG. 5 is a similar section taken on line 5—5 of FIG. 2.

Referring primarily to FIG. 5, a second operating linkage is embodied in the machine including another crank arm 49 adjustably mounted on the rocker shaft 15 and locked thereon in the desired angular position by set screws 50. The crank arm 49 operates a drive link 51 by engaging a cushioning spring 52 thereon and the link 51 is pivoted at 53 to a vertically swinging lever or link 54 whose upper end is secured to a rocker shaft 55 having a hammer arm 56 rigidly and adjustably secured thereto as by a set screw 57. The arm 56 carries an impact hammer 58 which, at the proper time, engages the cut piece of lumber to quickly dislodge it from the machine. In conjunction with this hammer, the machine has a hinged vertically swingable discharge bed section 59 normally disposed under the cut-off section of lumber and hinged at 60 to the adjacent rigid framework of the machine. The hinged bed section 59 is connected by an operating link 61 to the lower end of lever 54 by a pivot pin 62 so that rotation of the crank arm 49 with rocker shaft 15 will cause swinging movement of the hammer 58 and pivoting of the bed section 59 on its hinge axis simultaneously. Another extension arm 63 on the rocker shaft 15 is connected with a counter 64 preferably by a retractile spring 65 so that each lumber cut can be counted and recorded as the pieces discharge from the machine.

Figure 1:
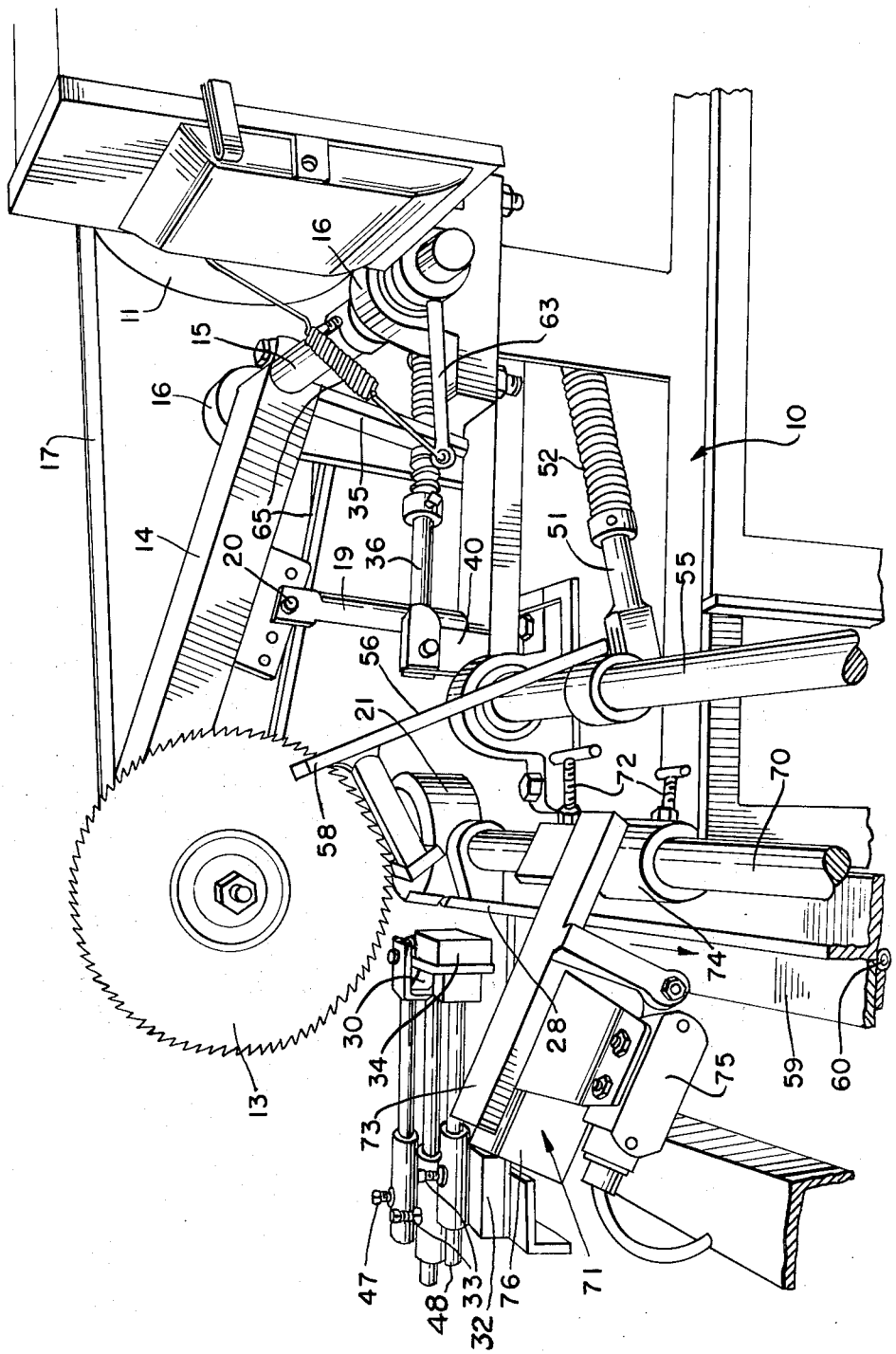
FIG. 1 is a fragmentary perspective view of an automatic cut-off saw embodying the invention looking upstream with respect to the direction of feed of the lumber through the machine.
Figure 2:
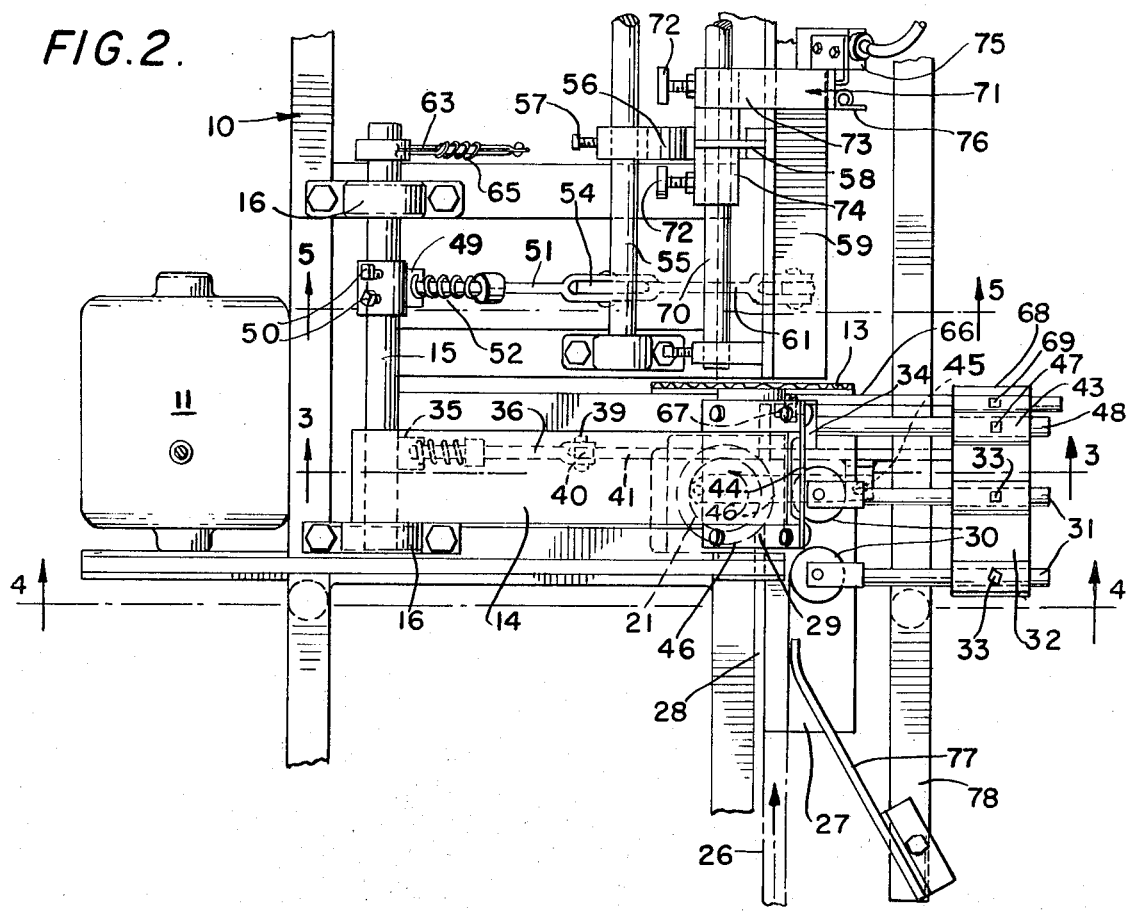
FIG. 2 is a fragmentary plan view of the machine.

An additional feature of the machine comprises a lumber hold-down arm 66 having a ball bearing roller 67 thereon to bear against the top of the lumber piece feeding through the machine to assure that the piece remains in contact with the bed of the machine and does not rise up. The hold-down arm 66 is also adjustable in its holder 68 through the use of a set screw 69, FIG. 2. The hold-down roller 67 lies close to the saw blade 13 and the saw blade operates in a slot adjacent one end of the hinged bed section 59 as best shown in FIG. 2.

A support bar 70 for a limit switch assembly 71 is fixedly mounted on the machine frame 10 or bed. The limit switch assembly 71 is adjustable along the bar 70 and lockable in selected adjusted positions by set screws 72 so that the length of the lumber cut can be varied through a wide range. The limit switch assembly is supported on the bar 70 through a suitable bracket structure 73 or the like having a shaft-receiving hub 74 into which the locking set screws are secured. The switch assembly 71 embodies a microswitch 75 or the like operated by a hinged plate or leaf 76 disposed directly in the path of the leading end of the oncoming piece of lumber. The limit switch 75 is conventionally electrically connected with a solenoid valve, not shown, controlling the operation of the pneumatic cylinder unit 18 which raises and lowers the saw arm at prescribed times. This raising and lowering operation initiates turning of the rocker shaft 15 with consequent movement of the two crank arms 35 and 49 and operation of the two linkages driven by these crank arms.

A conventional diagonal guide 77 upstream from the feed roller 21 and mounted on a forward rail 78 of the machine bed assists in guiding each piece of lumber 26 properly into the cut-off saw machine.

OPERATION

The operation of the machine may be summarized briefly as follows. When the machine is turned on by starting the motors 11 and 12 to drive the saw blade 13 and lumber feed roller 21, the saw blade will automatically assume the raised position shown in FIG. 4 above the lumber. In moving to this position, the rocker shaft 15 will rotate causing the crank arm 35 and its associated linkage including slide link 41 to shift the brake 34 out of engagement with the lumber and simultaneously shift the feed roller 21 into driving engagement with the lumber, as described. The lumber will now feed downstream beneath the holddown roller 67 and between the feed roller 21 and pressure wheels 30.

This feeding continues until the lumber advances across the hinged bed section 59 and strikes the limit switch actuating leaf 76 which is adjusted previously along the bar 70 for a predetermined exact length of lumber. When the limit switch 75 is closed by contact of the end of the lumber with the element 76, the solenoid-operated valve, not shown, controlling the operation of cylinder unit 18 reverses the flow of air going to the cylinder and thus retracts the piston rod 19 and pulls the saw arm 14 to the down or cutting position. The saw blade 73 swings in a vertical arc and enters the slot between the upstream end of bed section 59 and the hold-down roller 67 to cut off the lumber to exact length.

The saw, in moving downwardly, turns the rocker shaft 15 in the opposite direction causing the rigid crank arm 35 to shift feed roller 21 out of driving engagement with the lumber piece 26 and to reset the clamping brake 34 against the lumber piece, as in FIG. 3. Thus, the lumber is tightly held during passage of the saw blade 13 therethrough. After the cut has been made through the lumber and during the final downward movement of the saw 13, the shaft 15 will cause the second crank arm 49 thereon to operate the linkage consisting of elements 51, 54 and 61 in the described manner for dropping the hinged bed section 59 on its hinge axis 60 and simultaneously moving the hammer 58 down to knock the lumber piece cleanly out of the machine. This arrangement considerably speeds up the operation of the machine. The crank arm 49 is preadjusted to the proper angular position on the shaft 15 to cause the linkage in FIG. 5 to operate for discharging the lumber at precisely the right time.

As soon as the lumber piece disengages limit switch actuator 76, the switch re-opens and the solenoid valve, not shown, reverses the air flow to the cylinder 18 causing the saw arm 14 to return upwardly to its original position. In so doing, the rocker shaft 15 and the crank arms 35 and 49 thereon reset the two linkages which control, on the one hand, the feed roller 21 and brake 34 and, on the other hand, the hammer 58 and hinged bed section 59, and these elements all return to their original positions shown on the drawings ready for the start of an identical cycle of operation.

If desired, remotely located manual push buttons for the switch 75 may be placed anywhere about the machine so that an operator may control the machine manually as when cutting out knots or defects in the lumber.

The machine is particularly useful in the furniture industry where many parts, such as chair legs, must be cut to exact length but also has utility in various other fields.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A cut-off saw mechanism comprising a machine bed over which lumber pieces to be cut to predetermined length are adapted to be fed, a cut-off saw structure on the bed movable between cutting and inactive positions, power means connected with the saw structure to move it between said positions, a sensing element in the path of movement of lumber pieces across said bed operatively connected with said power means and dictating the operation of the latter, a feed roller for lumber pieces moving across said bed shiftable into and out of active engagement with said pieces and a co-operating lumber clamping brake element shiftable with the feed roller, an operating linkage for said feed roller and brake element common to both, a movable operator connected directly with the movable saw structure and operated by movement of the latter and having a connection with said linkage, whereby movement of the saw structure to said inactive position will shift the feed roller and the brake element to lumber feeding and release positions, respectively, and movement of the saw structure to the cutting position will shift the feed roller and brake element to non-feeding and holding positions, respectively, said machine bed having a hinged section immediately upstream from said sensing element and a lumber piece engaging hammer above said hinged section, a second operating linkage connected with the hinged bed section and hammer and common to both and said movable operator connected with said second operating linkage in such a manner that the final movement of said saw structure toward the cutting position will cause the second linkage to swing the hinged bed section to a lumber dumping position and to simultaneously move said hammer into contact with the lumber piece just cut to length.

2. The structure of claim 1, and said movable operator including a rocker shaft carrying the cut-off saw structure, and a pair of spaced crank arms on the rocker shaft and turning therewith and each having a driving connection with one of said operating linkages.

3. The structure of claim 2, and each driving connection including a spring interposed between one linkage part and the associated crank arm.

* * * * *